(12) United States Patent
Lewis et al.

(10) Patent No.: US 8,376,284 B2
(45) Date of Patent: Feb. 19, 2013

(54) SYSTEMS AND METHODS FOR TRACING AIRCRAFT VORTICES

(75) Inventors: Michael S. Lewis, Round Hill, VA (US); Jere S. Meserole, Bellevue, WA (US); Michael J. Dunn, Federal Way, WA (US); Brian J. Tillotson, Kent, WA (US)

(73) Assignee: The Boeing Company, Chicago, IL (US)

(*) Notice: Subject to any disclaimer, the term of this patent is extended or adjusted under 35 U.S.C. 154(b) by 417 days.

(21) Appl. No.: 12/625,421

(22) Filed: Nov. 24, 2009

(65) Prior Publication Data

US 2010/0133383 A1   Jun. 3, 2010

Related U.S. Application Data

(60) Division of application No. 11/647,063, filed on Dec. 27, 2006, now Pat. No. 7,686,253, which is a continuation-in-part of application No. 11/463,685, filed on Aug. 10, 2006, now abandoned.

(51) Int. Cl.
B64C 23/06   (2006.01)

(52) U.S. Cl. ........... 244/199.3; 244/75.1; 701/9; 701/14

(58) Field of Classification Search ............... 244/199.3, 244/75.1, 199.2, 199.1, 200.1, 1 R, 136; 701/9, 701/14; 340/968
See application file for complete search history.

(56) References Cited

U.S. PATENT DOCUMENTS

| | | | |
|---|---|---|---|
| 2,477,461 A | 7/1949 | Lee | |
| 2,650,781 A | 9/1953 | Taylor | |
| 3,012,740 A | 4/1958 | Wagner | |
| 3,090,584 A | 5/1963 | Kuchemann et al. | |
| 3,480,234 A | 11/1969 | Cornish | |
| 3,596,854 A | 8/1971 | Haney, Jr. | |
| 3,604,661 A | 9/1971 | Mayer, Jr. | |
| 3,692,259 A | 9/1972 | Yuan | |
| 3,761,929 A | 9/1973 | Wyatt | |
| 3,841,587 A | 10/1974 | Freed | |
| 3,845,918 A | 11/1974 | White, Jr. | |
| 3,881,669 A | 5/1975 | Lessen | |
| 3,936,013 A | 2/1976 | Yuan | |
| 3,974,986 A | 8/1976 | Johnstone | |
| 3,984,070 A | 10/1976 | Patterson, Jr. | |
| 3,997,132 A | 12/1976 | Erwin | |
| 4,137,764 A | 2/1979 | Hallock et al. | |
| 4,359,640 A | 11/1982 | Geiger | |

(Continued)

FOREIGN PATENT DOCUMENTS

| | | |
|---|---|---|
| DE | 1756541 | 4/1970 |
| DE | 10039109 | 2/2002 |

(Continued)

OTHER PUBLICATIONS

Crow, S.C., "Stability Theory for a Pair of Trailing Vortices," AIAA Journal, vol. 8, No. 12, pp. 2172-2179, Dec. 1970.

(Continued)

*Primary Examiner* — Christopher P Ellis
(74) *Attorney, Agent, or Firm* — Perkins Coie LLP

(57) ABSTRACT

Systems and methods for tracing aircraft vortices. One method includes directing a tracer from a first aircraft into a vortical flow generated by the first aircraft. The method can further include detecting a characteristic corresponding to the presence of the tracer directed into the vortical flow. Based at least in part on the detected characteristic, the method can include directing the flight of the first aircraft, or a second aircraft following the first aircraft, or both.

22 Claims, 6 Drawing Sheets

U.S. PATENT DOCUMENTS

| | | | |
|---|---|---|---|
| 4,477,042 A | | 10/1984 | Griswold, II |
| 4,735,503 A | | 4/1988 | Werner et al. |
| 4,860,976 A | | 8/1989 | McFadden et al. |
| 5,150,859 A | | 9/1992 | Ransick |
| 5,158,251 A | | 10/1992 | Taylor |
| 5,173,706 A | | 12/1992 | Urkowitz |
| 5,208,600 A | | 5/1993 | Rubin |
| 5,262,773 A | | 11/1993 | Gordon |
| 5,492,289 A | | 2/1996 | Nosenchuck et al. |
| 5,541,591 A | | 7/1996 | Bush |
| 5,634,613 A | | 6/1997 | McCarthy |
| 5,657,009 A | * | 8/1997 | Gordon .................. 340/968 |
| 5,724,040 A | | 3/1998 | Watnick |
| 5,755,408 A | | 5/1998 | Schmidt et al. |
| 5,758,823 A | | 6/1998 | Glezer et al. |
| 5,806,807 A | | 9/1998 | Haney |
| 5,813,625 A | | 9/1998 | Hassan et al. |
| 5,838,007 A | | 11/1998 | Wang |
| 5,845,874 A | | 12/1998 | Beasley |
| 5,918,835 A | | 7/1999 | Gerhardt |
| 5,938,404 A | | 8/1999 | Domzalski et al. |
| 5,957,413 A | | 9/1999 | Glezer et al. |
| 5,988,522 A | | 11/1999 | Glezer et al. |
| 6,062,076 A | | 5/2000 | Johari et al. |
| 6,070,461 A | | 6/2000 | Gjessing et al. |
| 6,082,679 A | | 7/2000 | Crouch et al. |
| 6,123,145 A | | 9/2000 | Glezer et al. |
| 6,129,309 A | | 10/2000 | Smith et al. |
| 6,138,955 A | | 10/2000 | Gutmark et al. |
| 6,177,888 B1 | * | 1/2001 | Cabot et al. .................. 340/968 |
| 6,184,816 B1 | | 2/2001 | Zheng et al. |
| 6,283,406 B1 | | 9/2001 | Remington et al. |
| 6,378,807 B1 | | 4/2002 | Tomioka |
| 6,394,397 B1 | | 5/2002 | Ngo et al. |
| 6,412,732 B1 | | 7/2002 | Amitay et al. |
| 6,422,518 B1 | | 7/2002 | Stuff et al. |
| 6,424,408 B1 | | 7/2002 | Ooga et al. |
| 6,425,553 B1 | | 7/2002 | Smith et al. |
| 6,471,477 B2 | | 10/2002 | Hassan et al. |
| 6,513,761 B2 | | 2/2003 | Huenecke et al. |
| 6,554,607 B1 | | 4/2003 | Glezer et al. |
| 6,629,674 B1 | | 10/2003 | Saddoughi et al. |
| 6,668,638 B2 | | 12/2003 | Huang |
| 6,683,541 B2 | * | 1/2004 | Staggs et al. .................. 340/961 |
| 6,703,945 B2 | | 3/2004 | Kuntman et al. |
| 6,963,291 B2 | | 11/2005 | Holforty et al. |
| 6,965,816 B2 | * | 11/2005 | Walker .................. 701/16 |
| 7,010,398 B2 | * | 3/2006 | Wilkins et al. .................. 701/3 |
| 7,017,862 B1 | | 3/2006 | Fischbach |
| 7,100,875 B2 | | 9/2006 | Shmilovich et al. |
| 7,104,143 B1 | | 9/2006 | Powell |
| 7,333,030 B2 | | 2/2008 | Baranov et al. |
| 7,510,149 B2 | | 3/2009 | Miller et al. |
| 7,661,629 B2 | | 2/2010 | Shmilovich et al. |
| 7,874,522 B2 | * | 1/2011 | Lewis et al. .................. 244/181 |
| 2002/0024652 A1 | | 2/2002 | Ooga |
| 2002/0089432 A1 | * | 7/2002 | Staggs et al. .................. 340/945 |
| 2003/0222795 A1 | * | 12/2003 | Holforty et al. .................. 340/968 |
| 2006/0244637 A1 | * | 11/2006 | Baranov et al. .................. 340/968 |
| 2007/0034746 A1 | | 2/2007 | Shmilovich et al. |
| 2007/0045476 A1 | | 3/2007 | Shmilovich et al. |
| 2007/0051855 A1 | | 3/2007 | Shmilovich et al. |
| 2007/0103340 A1 | * | 5/2007 | Baranov et al. .................. 340/968 |
| 2008/0030375 A1 | * | 2/2008 | Cotton et al. .................. 340/945 |
| 2008/0035784 A1 | | 2/2008 | Meserole et al. |
| 2008/0035789 A1 | | 2/2008 | Lewis et al. |
| 2008/0042013 A1 | | 2/2008 | Shmilovich et al. |
| 2009/0173835 A1 | | 7/2009 | Shmilovich et al. |
| 2010/0133384 A1 | | 6/2010 | Lewis et al. |

FOREIGN PATENT DOCUMENTS

| | | |
|---|---|---|
| EP | 0689990 | 1/1996 |

OTHER PUBLICATIONS

"Wake Data and Safety Assessment Methods," 1st Workshop WakeNet2-Europe (organised in collaboration with WakeNet-USA), London,Heathrow Control Tower, Nov. 11-12, final Aug. 11, 2003, 18 pages.

Choroba et al. "The Concept of Integrated Air Traffic Control Wake Vortex Safety and Capacity System," IEEE Oct. 2003, vol. 1, pp. 684-688.

Holzapfel, Frank, "Analysis of Wake Vortex Decay Mechanisms in the Atmosphere," Aerospace Science and Technology 7, 2003, pp. 263-375.

International Search Report and Written Opinion for PCT/US07/016394; Applicant:The Boeing Company; mailed Oct. 29, 2008, 15 pages.

Langevin, Gail., "Wake-Vortex Hazard," NASA Verified to 2004 by WaybackMachine.

Lewellen, D.C. et al., "Large-Eddy Simulations and Lidar Measurements of Vortex-Pair Breakup in Aircraft Wakes," Aug. 8, 1998, AIAA Journal, vol. 36 No. 8, pp. 1439-1445.

Rodenhiser, R., "An Ultrasonic Method for Aircraft Wake Vortex Detection," Aug. 30, 2005, 115 pgs, Worcester Polytechnic Institute.

Sauvage, L., et al., "WB Separations Technology Case, Preparation of Wake Vortex Detection Technology Case, Eurocontrol EEC TRSC52/2004, Public Summary Report," 29 pgs, Mar. 2005, Leosphere, Paris, France.

Socrates Wake Vortex Tection and Tracking: A Technical Status Report, Nov. 22, 2004, 29 pgs, Flight Safety Technology, Lockheed Martin.

Tank, W., "Airplane wake detection iwth a VHF cw bistatic radar," Jan. 1997, 13 pgs, AIAA Meeting Papers, American Institute of Aeronautics and Astronautics, Inc.

Wall, Robert, "Airbus Cries Foul in A380 Wake Vortex Debate," 2 pgs, http://www.aviationnow.com/search/AvnowSearchResult.do?reference, accessed Jan. 10, 2006.

Duraisamy, Karthikeyan "Control of Tip Vortex Structure Using Steady and Oscillatory Blowing," AIAA 2003-3407, Presented at 21st Applied Aerodynamics Conference, Jun. 23, 2003, 12 pages.

* cited by examiner

SYSTEMS AND METHODS FOR TRACING AIRCRAFT VORTICES

CROSS-REFERENCE TO RELATED APPLICATION

The present application is a divisional of U.S. patent application Ser. No. 11/647,063, filed Dec. 27, 2006 now U.S. Pat. No. 7,686,253, entitled SYSTEMS AND METHODS FOR TRACING AIRCRAFT VORTICES, which is a continuation-in-part of U.S. application Ser. No. 11/463,685, titled "Aircraft Wake Vortex Predictor and Visualizer," filed on Aug. 10, 2006 now abandoned and incorporated herein in its entirety by reference.

TECHNICAL FIELD

Aspects of the present disclosure are directed generally toward systems and methods for tracing aircraft vortices.

BACKGROUND

Air traffic volumes continue to grow, and the capacity limitations at airports are causing increasing flight delays. The capacity limitations come, in part, from wake turbulence created by aircraft, which limits how closely aircraft can be spaced during takeoff and landing. These limitations apply to both single runway operations and parallel runway operations. Typically, for example, aircraft takeoffs and landings will be spaced by up to three minutes, depending on how much smaller the following aircraft is than the leading aircraft. This spacing allows turbulence to move off the runway and flight path, or to dissipate, before the following aircraft encounters the turbulence.

Wake turbulence is generated in the form of vortices trailing from aircraft wing tips and other lifting surfaces. The pair of vortices generated by each aircraft is the result of lift being generated by the wings and air rotating around the wing tip from the high pressure regions at the bottom of the wing to the low pressure regions at the top of the wing. The strength of the vortices depends upon the aircraft speed and configuration, and upon the instantaneous lift being generated by the wing. While there are ways to reduce the strength of the vortices, they cannot be eliminated. The vortices can severely buffet another aircraft that flies into them, and the vortices from a transport aircraft flying at landing or take-off speeds can upend small aircraft and cause them to lose control.

Wing tip vortices generally cannot be directly visualized at low altitudes, except in rare atmospheric conditions. In research experiments, wake turbulence has been measured with sophisticated and costly laser Doppler devices positioned along the flight path. The lasers are typically aimed across the flight path to detect the characteristic approaching and receding motions of air within the vortices. Such equipment, however, does not operate in all weather conditions and may be too costly for routine airport operations. As a result, aircraft takeoff and landing separations are typically established assuming the worst conditions. This may apply not only to single runways but also to dual approach paths associated with runways significantly less than one mile apart. These minimum separations are often greater than what would be adequate for complete safety if the location and movement of the vortices were known with certainty so that they could be avoided with minor changes in flight path. Accordingly, there is a need for improved methods and systems for detecting and responding to aircraft vortices.

SUMMARY

The following summary is provided for the benefit of the reader only, and is not intended to limit in any way the scope of the invention as set forth by the claims. Aspects of the present disclosure are directed to systems and methods for tracing aircraft vortices. A method for identifying aircraft vortical flows in association with one aspect includes directing a tracer from a first aircraft into a vortical flow generated by the first aircraft, and detecting a characteristic corresponding to the presence of the tracer directed into the vortical flow. The method can further include, based at least in part on the detected characteristic, directing the flight of the first aircraft, or a second aircraft following the first aircraft, or both. For example, the method can include controlling a separation distance between the first aircraft and the second aircraft, and/or directing the second aircraft away from the vortical flow.

The tracer can include a gas (e.g., a gas that is lighter than air) so that the tracer tends to move to the center of the vortex. In other embodiments, the gas can be contained in envelopes (e.g., small balloons). In still further embodiments, the tracer can include chaff or other solid objects deployed from the aircraft. In yet further embodiments, the tracer can include energy. For example, the tracer can include energy that is directed into the air entrained in the vortical flow so as to ionize air molecules in the vortical flow. The ionized air molecules are detectable and distinguishable from the surrounding non-ionized air molecules, e.g., via radar. In other embodiments, directing energy into the vortical flow can include changing other characteristics of the air molecules. For example, the directed energy can increase the electronic state of an air molecule, and the energy emitted by the molecule as it returns to its initial energy state can then be detected. In any of the foregoing embodiments, the tracer can be directed in a time-varying manner to distinguish the tracer from its environment.

A method for identifying aircraft vortical flows in association with another aspect includes generating a vortical flow in air adjacent to an aircraft by moving the aircraft relative to the adjacent air, and directing a tracer from the aircraft into the vortical flow. The tracer is visually indistinguishable from its surroundings to an unaided observer on the ground or in a following aircraft while the tracer is in the vortical flow.

A method in accordance with another aspect includes detecting a characteristic correlated with the presence of a tracer directed from an aircraft into vortical flow in air adjacent to the aircraft as the aircraft moves relative to the adjacent air. The tracer is visually indistinguishable from its surroundings to an unaided observer on the ground or in a following aircraft while the tracer is in the vortical flow. The method can further include generating a signal in response to detecting the presence of the tracer.

In further particular aspects, the method can further include controlling a separation distance between a first aircraft (from which the tracer is directed) and a second aircraft following the first aircraft, or directing the second aircraft away from the vortical flow, or both controlling the separation distance and directing the second aircraft away from the vortical flow, based at least in part on the generated signal. The characteristic correlated with the tracer can be detected from the ground or from another aircraft. In further embodiments, energy can be added to the tracer and the method can further include detecting energy emitted by the tracer.

Still another aspect is directed to an aircraft that includes a payload volume, a lifting surface positioned to generate lift and an associated vortical flow, and an onboard vortical flow tracer system that includes a tracer director positioned to direct a tracer into vortical flow generated by lifting surface, with the tracer being visually indistinguishable from its surroundings to an unaided observer on the ground or in a following aircraft while the tracer is in the vortical flow. The vortical flow tracer system can further include a controller operatively coupled to the tracer director to selectively activate the tracer director.

Still another aspect is directed to a system for identifying vortical flow, which includes a ground-based detector having a detection vector aligned axially with an active runway final approach/departure axis. A controller is operatively coupled to the detector, and an output device is operatively coupled to the detector to provide an indication when the detector identifies a characteristic associated with a tracer in a vortical flow. In particular embodiments, the detector can include at least one of a radio signal detector, a radar detector, a lidar detector, or an optical detector.

DETAILED DESCRIPTION

The following description is directed generally toward systems and methods for tracing aircraft vortices. Several details describing structures or processes that are well-known and often associated with aspects of the systems and methods are not set forth in the following description for purposes of brevity. Moreover, although the following disclosure sets forth several embodiments of different aspects of the invention, several other embodiments of the invention can have different configurations or different components than those described in this section. As such, the invention may have other embodiments with additional elements or without several of the elements described below with reference to FIGS. 1-7.

Several embodiments of the invention described below may take the form of computer-executable instructions, including routines executed by a programmable computer. Those skilled in the relevant art will appreciate that the invention can be practiced on computer systems other than those shown and described below. The invention can be embodied in a special-purpose computer or data processor that is specifically programmed, configured or constructed to perform one or more of the computer-executable instructions described below. Accordingly, the term "computer" as generally used herein refers to any data processor and can include Internet appliances and hand-held devices (including palmtop computers, wearable computers, cellular or mobile phones, multi-processor systems, processor-based or programmable consumer electronics, network computers, minicomputers and the like). Information handled by these computers can be presented at any suitable display medium, including a CRT display or LCD.

The invention can also be practiced in distributed environments, where tasks or modules are performed by remote processing devices that are linked through a communication network. In a distributed computing environment, program modules or subroutines may be located in local and remote memory storage devices. Aspects of the invention described below may be stored or distributed on computer-readable media, including magnetic or optical readable or removable computer disks, as well as distributed electronically over networks. Data structures and transmissions of data particular to aspects of the invention are also encompassed within the scope of the invention.

Figure 1:
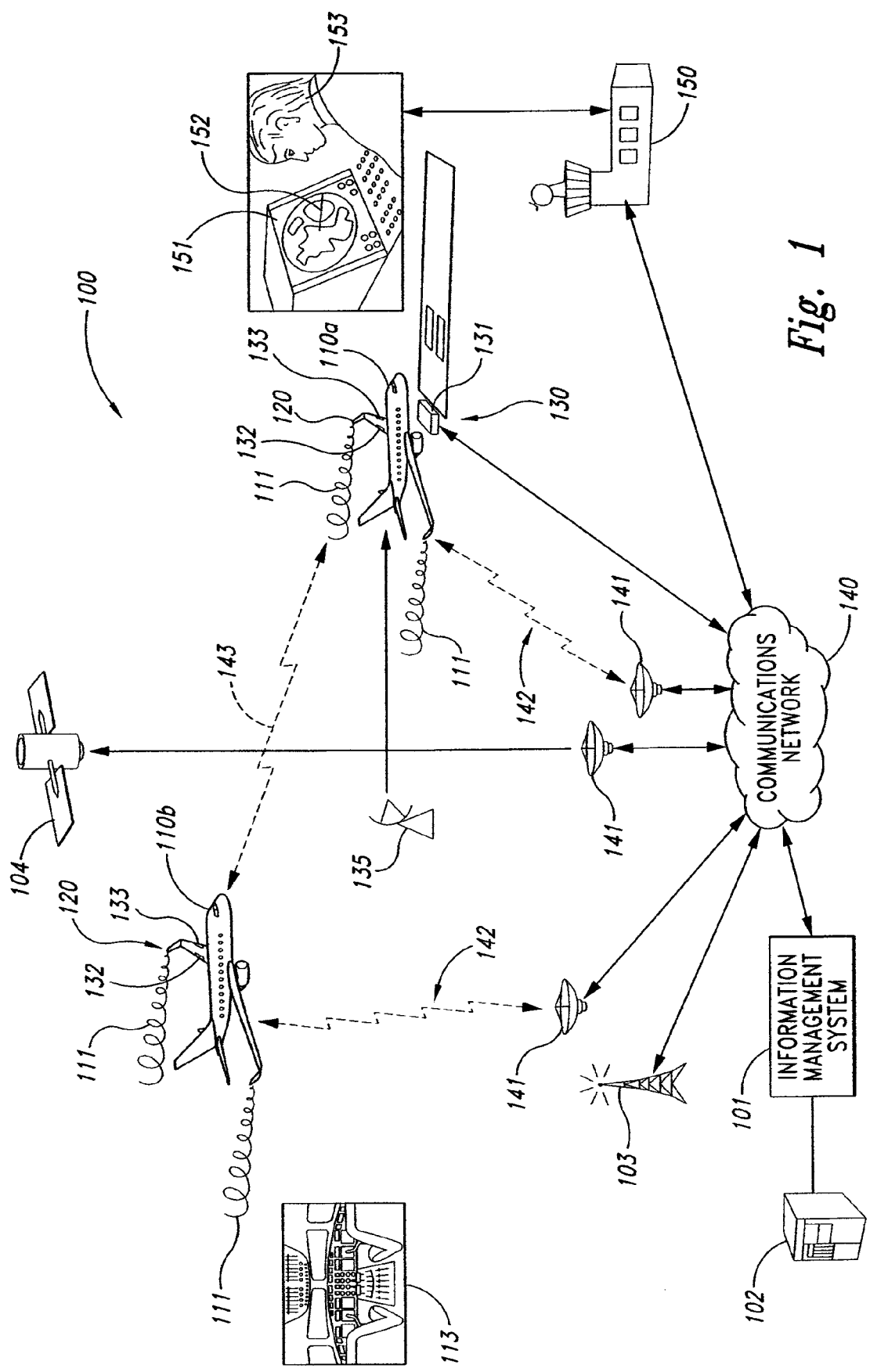
FIG. 1 is a schematic illustration of a system for directing tracers into aircraft vortical flows, detecting the tracers, and providing an associated feedback.

FIG. 1 is a schematic illustration of a system 100 for directing tracers into aircraft vortical flows, and detecting characteristics associated with the presence of the tracers in the vortical flows. This system 100 generally include a tracer director 120 carried by an aircraft, and a tracer detector 130, portions of which may be carried by one or more aircraft, and other portions of which may be ground-based. Aspects of the overall system are described below with reference to FIG. 1. Aspects of particular embodiments of the tracer directors 120 are then described with reference to FIGS. 2-4. The operation of the tracer directors and detectors are described with reference to flow diagrams shown in FIGS. 5 and 6, respectively, and FIG. 7 illustrates a tracer detector configured in accordance with a particular embodiment of the invention.

By operating the tracer director and tracer detector in accordance with particular embodiments of the invention, operators can more accurately identify the location of aircraft vortices and can direct following aircraft (and/or other aircraft) in accordance with this information. As a result, aircraft controllers can space aircraft according to actual vortex data, which is expected to reduce aircraft following distances when compared with traditional techniques that often assume vortex conditions more severe than they actually are.

The tracer directors 120 can be carried by one or more aircraft 110, shown in FIG. 1 as a first or leading aircraft 110a and a second or following aircraft 110b. The tracer directors 120 direct a tracer into the aircraft wake vortices 111 generated by the aircraft 110a, 110b, where characteristics associated with the tracers can be detected by the tracer detector 130. Optionally, the characteristics can be made more detectable to the tracer detector 130 by energy directed into the vortices from an aircraft-based source or a ground-based source 135. The information obtained by the tracer detector 130 corresponds to the location of the vortices 111. The tracer detector 130 can include one or more detector elements, for example, a ground-based detector 131 and/or one or more airborne detectors. The airborne detectors can include a first airborne detector 132 positioned to detect the presence of the vortex 111 generated by the aircraft in which it is housed. Accordingly, the first airborne detector 132 on the leading aircraft 110a can be positioned to detect the vortex 111 generated by the leading aircraft 110a. This information may be useful as a diagnostic tool (e.g., to verify the operational state of the tracer director 120), and/or to provide information about the location of the vortex 111. The system 100 can also include a second airborne detector 133 positioned to detect the vortices of another aircraft. For example, the second airborne detector 133 on the following aircraft 110b can be positioned to detect the vortex 111 generated by the leading aircraft 110a.

The information generated by the tracer detector 130 can be provided to a communication network 140 for distribution to other components of the overall system 100, as appropriate. Accordingly, the communication network 140 can include ground stations 141 that support air-to-ground links 142 with the aircraft 110a, 110b. The ground stations 141 can also communicate with overhead satellites 104 which may provide additional information. Still further information may be provided by weather sensors 103 and the ground-based detector 131. An information management system 101 controls and manages the information provided to the communications network 140 via a processor 102 or other suitable device. In particular instances, the processor 102 may also house predictive tools, such as those disclosed in co-pending U.S. application Ser. No. 11/463,685 previously incorporated by reference. Predictions carried out by these tools may be compared with actual data received by the tracer detector 130.

The communications network 140 can route the information received from the tracer detector 130 to the appropriate locations. One such location includes an air traffic services (ATS) facility 150, at which air traffic controllers view an air traffic display 151. A representation 152 of the vortices detected by the tracer detector 130 can be overlaid on the air traffic display 151 to aid an air traffic controller 153 in routing the aircraft within his or her control. In particular, the air traffic controller 153 can use this information to direct the following aircraft 110b, which is potentially affected by the vortices 111 generated by the leading aircraft 110a. Information may also be communicated directly to the following aircraft 110b from the ground stations 141, or from the leading aircraft 110a, via an air-to-air link 143. Accordingly, the operator of the leading aircraft 110a may have information about the vortices generated by his or her aircraft, the air traffic controller 153 can receive and act upon this information, and the operator of the following aircraft 110b can also receive and act upon this information, either directly, or with the assistance of the air traffic controller 153.

Figure 2:
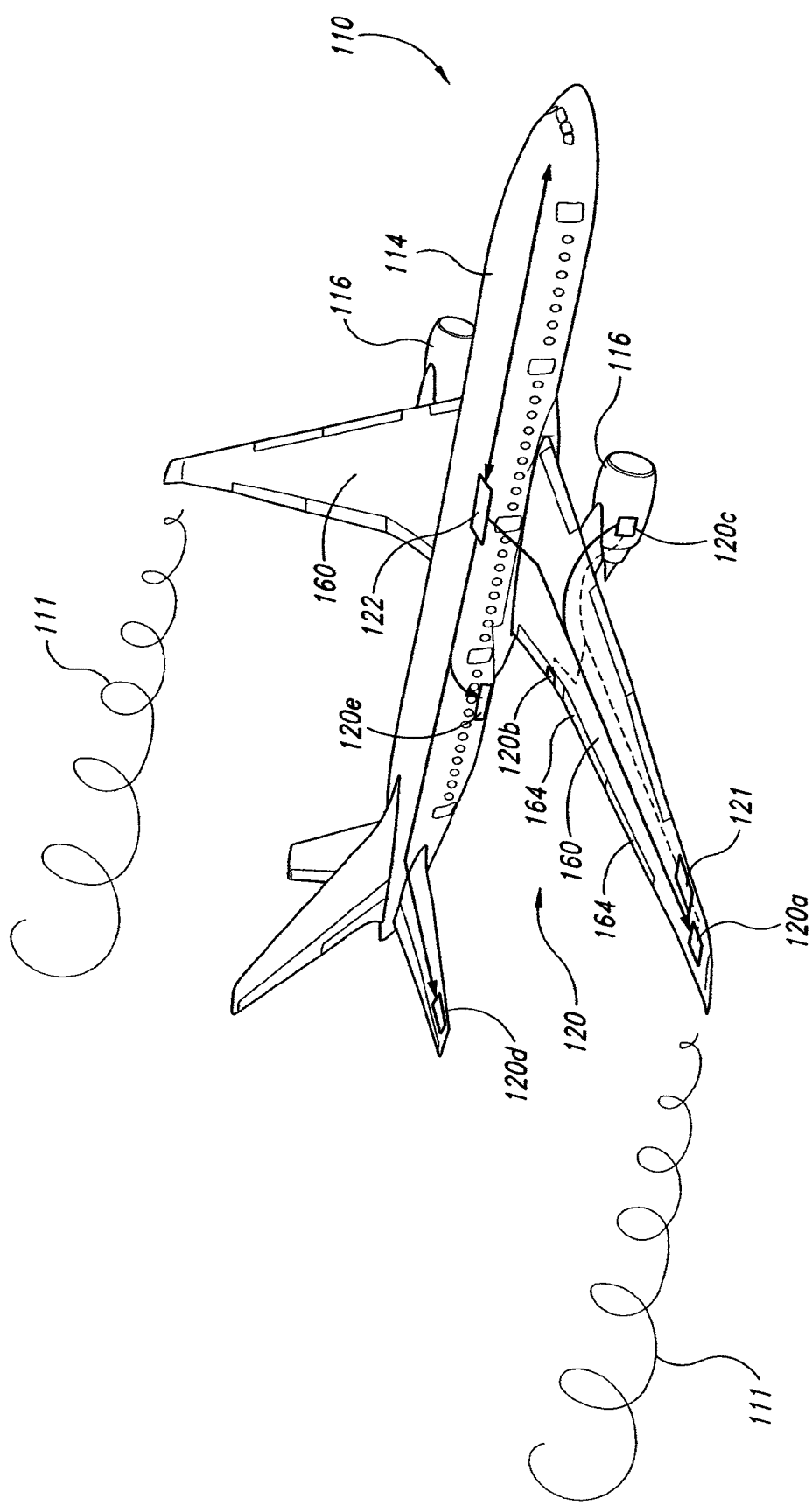
FIG. 2 is a partially schematic illustration of an aircraft having tracer directors configured in accordance with several embodiments of the invention.

FIG. 2 is a partially schematic, isometric illustration of a representative aircraft 110 (e.g., a commercial passenger and/or cargo transport aircraft) carrying several tracer directors 120 (illustrated as tracer directors 120a-120e) configured in accordance with several embodiments of the invention. In general, it is expected that a given aircraft 110 will include only one such tracer director, but for purposes of illustration, several different types of tracer directors are shown on the same aircraft 110 in FIG. 2. In particular embodiments described further below, the aircraft 110 can include multiple tracer directors.

The aircraft 110 can include a fuselage 114, wings 160, and engines 116 which provide the main propulsive force for the aircraft 110. In an embodiment shown in FIG. 2, the engines 116 are carried by the wings 160, but in other embodiments, the engines 116 may be carried by the fuselage 114 or other portions of the aircraft 110. In a particular embodiment shown in FIG. 2, a first tracer director 120a is housed in one or both of the wings 160. For purposes of illustration, the first tracer director 120a is shown housed in only one of the wings 160. The first tracer director 120a can be coupled to a reservoir 121 which carries tracer elements directed into the vortices 111 by the first tracer director 120a, and a controller 122, which manages the operation of the tracer director(s) 120.

The tracer elements can include any of a wide variety of elements that are detectable by the tracer detector 130 (FIG. 1). In particular embodiments, the tracer elements are visually distinguishable to an unaided observer, and in other embodiments, the tracers are not visually distinguishable from their immediate surroundings by an unaided observer, either on a following aircraft, or on the ground. For example, the tracer elements can include an energized gas, such as ammonia, which is directed from the wing 160 into the vortex 111. Further detail of this and other embodiments of the tracers are described in greater detail below with reference to FIG. 5.

In other embodiments, the tracer director can be located at portions of the aircraft 110 other than the wing tip. For example, a representative second tracer director 120b can be positioned proximate to a flap or other high lift device 164 of the aircraft 110. This location may be suitable when it is expected that the strongest and/or most easily detected vortices generated by the aircraft are those generated by and/or proximate to the high lift devices 164. In still further embodiments, the tracer detectors can be positioned at other locations on the aircraft. For example, a third tracer director 120c can be carried by the engine 116 so as to emit tracers via the engine exhaust stream. This arrangement may be suitable where the engine exhaust stream is expected to be entrained by the aircraft vortices, for example, vortices generated by the flaps or other wing high lift devices 164.

The first, second, and third tracer directors 120a-120c described above can be coupled to the reservoir 121 which delivers physical material to the corresponding tracer director for ejection into the adjacent vortical flow. The material can include a gas, liquid, solid, vapor or mist. In other embodiments, the tracer director can direct energy, rather than physical particles, into the vortical flow. In such cases, the tracer director can have any of the locations described above with reference to the tracer directors 120a-120c. Alternatively, the tracer director can direct energy into the vortical flow from a more remote location. For example, fourth and fifth tracer directors 120d and 120e can be positioned in the tail and fuselage, respectively of the aircraft 110 and aimed laterally toward the vortices 111. In another embodiment described below with reference to FIG. 4, a general similar tracer director can be positioned closer to the wing tip. It is expected that the energy directed into the vortices 111 by the tracer directors 120d, 120e will be absorbed by molecules in the vortical flow. The absorbed energy can make the molecules more visible e.g., by ionizing the molecules, or when the energy is re-emitted by the molecules (via a change in molecular energy state and/or electronic energy state). In either embodiment, the effect of the energy is to make the vortical flow detectable or more detectable by the tracer detector 130 (FIG. 1).

In a particular embodiment, one or more of the tracer directors 120a-120e may be carried by the same aircraft 110. For example, the aircraft 110 can include multiple independent or partially independent tracer directors for purposes of redundancy. In other embodiments, the aircraft 110 can include multiple tracer directors that are configured to work together. For example, the aircraft 110 can include one tracer director (e.g., one of tracer directors 120a-120c) to direct a physical substance into the vortical flow, and another (e.g., one of the tracer directors 120d-120e) to add energy to the physical substance and/or the vortical flow generally.

Figure 3:
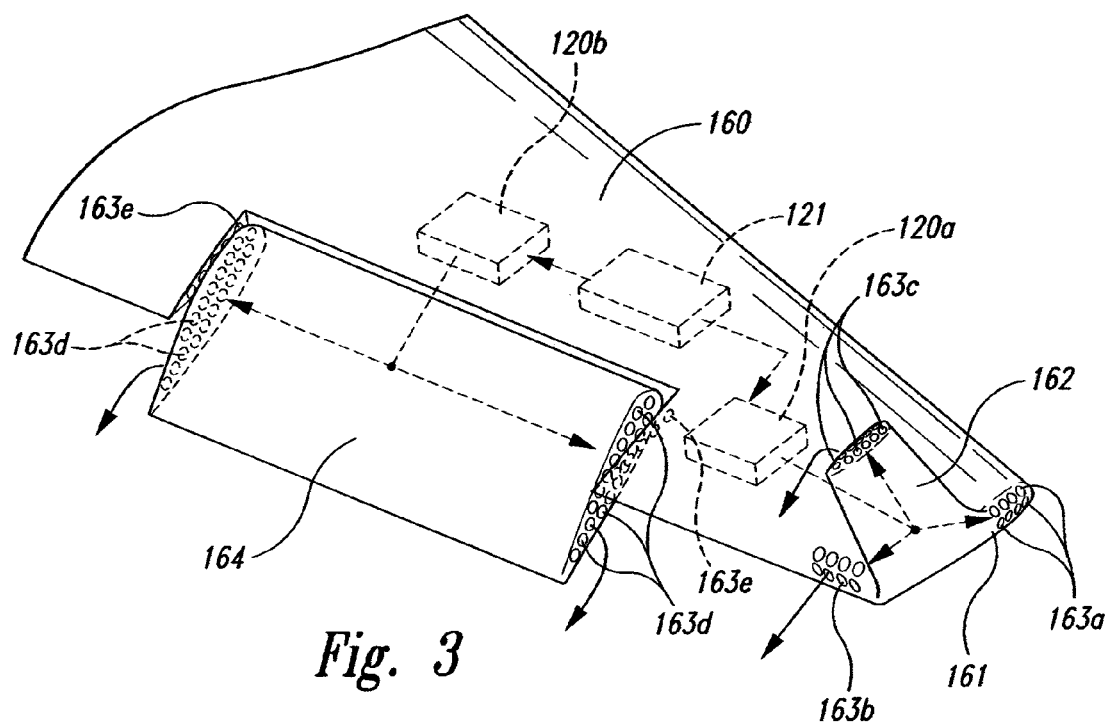
FIG. 3 is an enlarged, partially schematic illustration of a wing tip region housing tracer directors in accordance with several embodiments of the invention.

FIG. 3 is an enlarged, partially schematic illustration of the wing 160 shown in FIG. 2, along with the first and second tracer directors 120a, 120b. The first tracer director 120a can receive tracer elements from the reservoir 121 and direct them through any of a variety of delivery apertures 163. For example, the tracer elements can be directed through one or more delivery apertures 163a located in a wing tip 161, one or more delivery apertures 163b located at the trailing edge of the wing 160, and/or one or more delivery apertures 163c located in a winglet 162 of the wing 160. The second tracer director 120b can direct tracer elements through one or more delivery apertures 163d located at the inboard and/or outboard tips of the wing flap or other high lift device 164. In another embodiment, delivery apertures 163e can be positioned in the wing 160 along the opening into which the high lift device 164 retracts. The number of delivery apertures 163a-163d shown in FIG. 3 is representative of particular embodiments. In other embodiments, the number of delivery apertures 163a-163d can be smaller (e.g., a single delivery aperture 163a-163d for each corresponding location) or greater than the number shown in FIG. 3.

Figure 4:
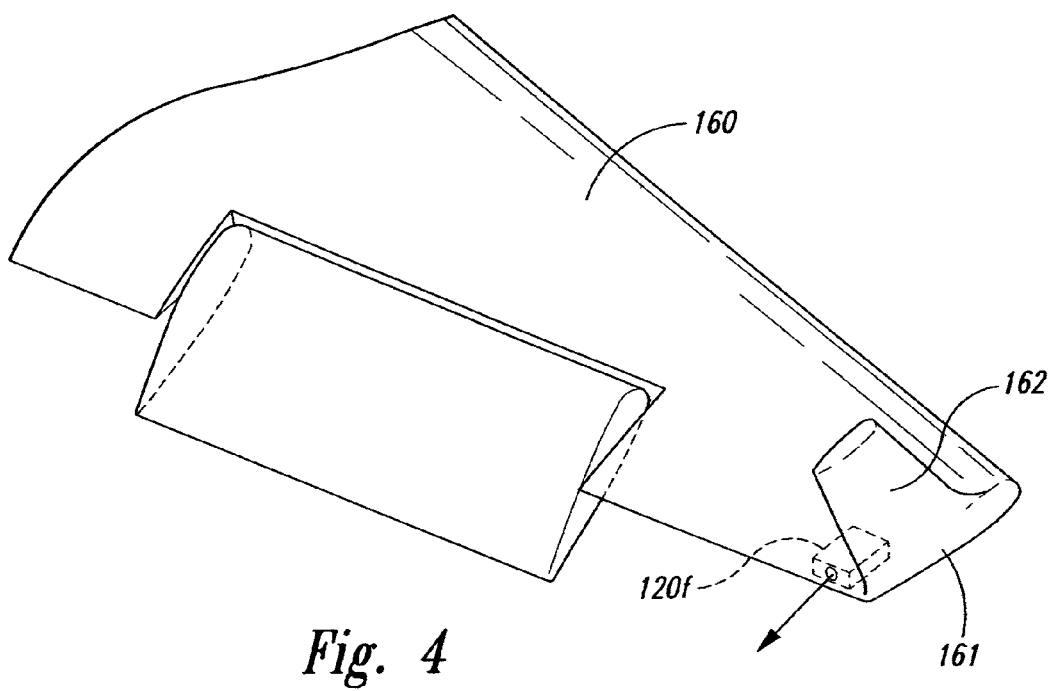
FIG. 4 is an enlarged illustration of a portion of an aircraft wing tip housing a tracer director that directs energy into a vortical flow in accordance with an embodiment of the invention.

FIG. 4 is a partially schematic illustration of the wing 160 with a sixth tracer director 120f positioned at the wing tip 161 to direct energy into the adjacent vortical flow. In one embodiment, the sixth tracer director 120f can include an ionizer that ionizes air molecules proximate to the wing tip 161. The ionizer can include one or more electrically charged sharp or pointy surfaces that effectively ionize adjacent air molecules. The ionized air molecules are expected to be more highly reflective to radar (or other electromagnetic waves) than are the surrounding non-ionized molecules. Accordingly, the ionized molecules can provide an indication of the vortex location.

Figure 5:
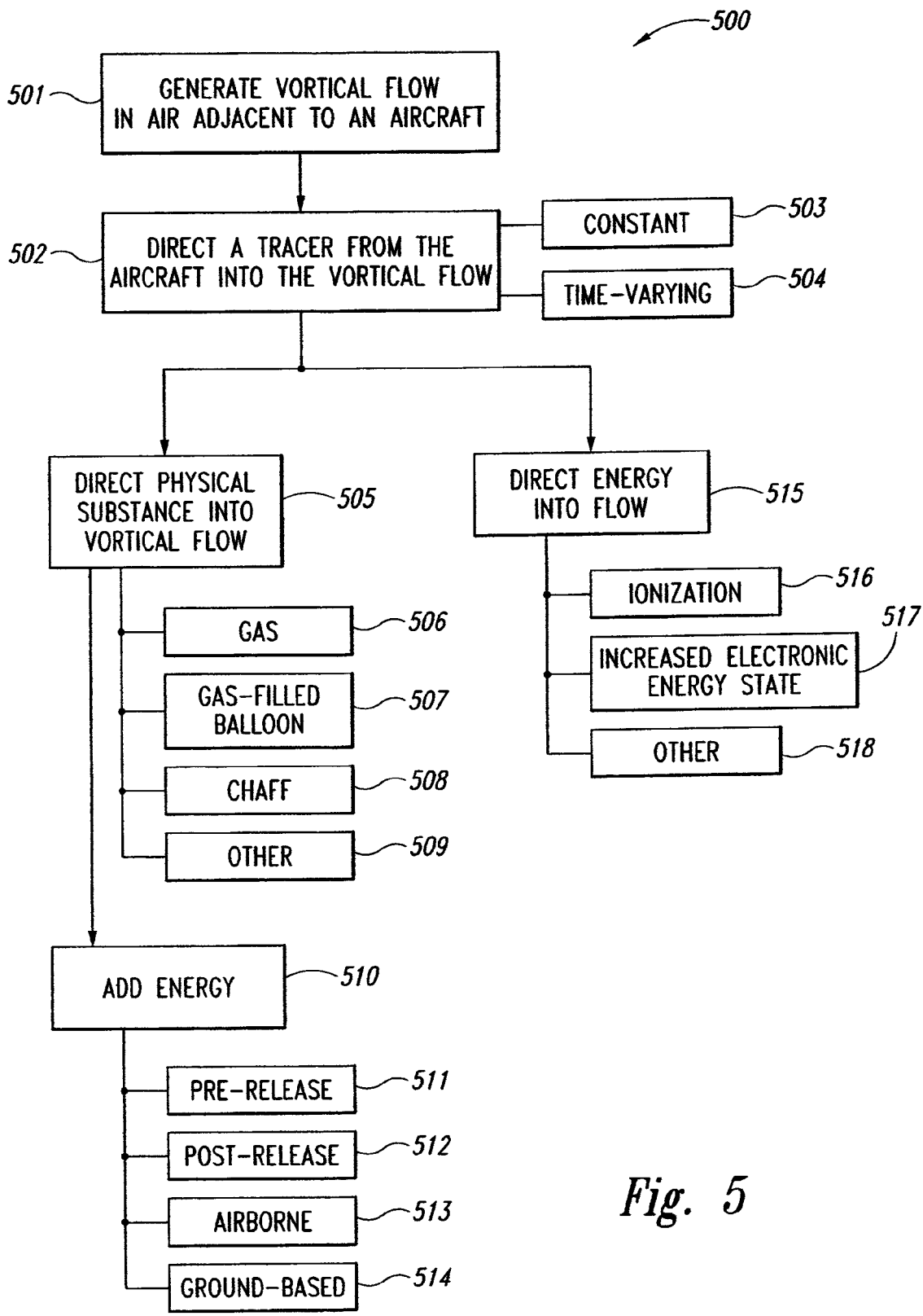
FIG. 5 is a flow diagram illustrating a process for directing tracers from an aircraft into a vortical flow generated by the aircraft.

FIG. 5 is a flow diagram illustrating a process 500 for directing tracers into a vortical flow using one or more of the tracer directors described above. Process portion 501 includes generating a vortical flow in air adjacent to an aircraft. Process portion 502 includes directing a tracer from the aircraft into the vortical flow. The tracer can be directed into the vortical flow in a constant manner, as indicated at block 503, or in a time-varying manner, as indicated at block 504. One expected advantage associated with directing the tracer in a time-varying manner is that doing so may make the tracer more distinguishable from its environment. For example, if the surrounding environment provides a steady state background noise level picked up by the tracer detector, then a tracer that appears in a time varying manner is likely to stand out more distinctly against the background. If the surrounding environment provides a time-varying background noise level picked up by the tracer detector, then the tracer can be emitted in a manner that varies with time differently than does the background noise. Appropriate filtering techniques can then be used to segregate the desired signal (associated with the tracer) from the background noise (associated with the environment).

In process portion 505, a physical substance is directed into the vortical flow. The physical substance can include a gas (block 506) a gas-filled balloon or other type of envelope (block 507), chaff (block 508), or other substances (block 509). When a gas is directed into the vortical flow, it can be selected in accordance with several design criteria, including its compatibility with the environment and its buoyancy. For example, ammonia can be selected because it is lighter than air and, due to the centrifugal force produced in the vortex, is therefore expected to be forced toward the core or center of the vortex. As a result, ammonia (or another buoyant gas) is expected to remain with the vortex for a relatively long period of time, and therefore provide a relatively long-lived indication of the vortex's presence. Ammonia is also expected to have a relatively low environmental impact on the region over which is it dispersed.

Ammonia can be excited (e.g., via an ammonia maser or other microwave device) at a resonant frequency of 23.9 GHz, effectively producing a microwave fluorescence. In other embodiments, other devices may be used to excite the ammonia. In other embodiments, the ammonia can be excited at other frequencies around the resonant frequency (e.g., to accommodate line broadening). Ammonia ($NH_3$) has a strong dipole moment and can readily undergo a room temperature "nitrogen inversion," in which the nitrogen atom passes through the plane formed by the three hydrogen atoms, at an energy of 24.7 kJoule/mole which corresponds to the 23.9 GHz. resonant frequency. This resonant frequency in turn corresponds to a microwave radiation wavelength of 1.26 centimeters, which is close to the original K-band radar of 24 GHz. This is near but on the high side of the absorption band for water and therefore is expected to be sufficiently detectable or distinguishable from water molecules. Ammonia also has infrared absorption/emission bands at wavelengths of 2.9, 3.0, 6.146, and 10.53 microns. Accordingly, infrared techniques, rather than radar techniques, may alternatively be used to detect ammonia.

In other embodiments, the tracer can include a gas other than ammonia. For example, other gases which have been examined, but are expected not to be desirable as ammonia include hydrogen, helium, methane, water vapor, hydrogen fluoride, neon, acetylene, diborane, carbon monoxide, nitrogen, and ethylene. In still further embodiments, other gases or gas mixtures may be used. For example, individual gases that are generally undetectable when apart, but detectable when mixed, can be mixed and discharged from the aircraft as tracers.

If a gas-filled balloon is used as a tracer element (block 507), the gas may be selected to be buoyant, as described above, and the balloon may be selected to be biodegradable. In a particular embodiment, the gas may be selected not only to be buoyant, but also to chemically react with the balloon so as to hasten its degradation. Accordingly, microballoons may be filled with such a gas immediately prior to being deployed from the aircraft. Once deployed, the buoyant gas within the balloon will tend to keep the balloon within the vortex core. The characteristics of the gas and the balloon can be selected using techniques known to those of ordinary skill in the relevant art to cause the balloon to dissolve after a selected time period (e.g., about one minute), allowing sufficient time to detect the balloon, and then the balloon can degrade completely or at least partially before reaching the ground. For example, the gas can include an acidic or other corrosive component.

If chaff is selected as the tracer element (block 508), it may be selected to be especially reflective at particular wavelengths, e.g., radar wavelengths. The chaff may also to be readily biodegradable, in the air and/or upon reaching the ground.

Other substances (block 509) may also be used as tracer elements. For example, very small carbon dioxide crystals can be directed into the vortical flow, where they can reflect radar energy. In another embodiment, the tracer elements can include crystals formed from local constituents. For example, the crystals can be formed from ambient water vapor and/or water vapor present in the engine exhaust. These crystals can form contrails or contrail-like structures that are detectable visually or by other detectors. In still another embodiment, the tracer elements can be self-powered (e.g., with a battery) and can emit radio signals, or the elements can receive radio signals (or signals at other wavelengths) and reemit radiation which is then detected. Accordingly, these elements can operate in the manner of self-powered or stimulated RFID devices. These elements may be selected to be buoyant compared to air molecules, and readily biodegradable. Buoyancy can be increased by adding a lighter-than-air gas to the tracer, or by adding a parachute or similar device. Micro- or nanoparticles can be formed into 3-D shapes, with a bonding agent that allows the particles to decompose rapidly in the presence of water vapor or sunlight. Suitable water-soluble agents and UV-sensitive agents are well known to those of ordinary skill in the relevant art.

Optionally, energy can be added to the tracer for increased detectability (block 510). For example, if the tracer in its normal state is not highly detectable, energy can be added to the tracer prior to release from the aircraft (block 511). Energy can be added to the tracer after release (block 512), either in addition to or in lieu of adding energy prior to release. For example, if the tracer emits energy over such a short time period that it is not easily detected, then energy can be added to the tracer after it has been released. If in some instances it is easier to add energy to the tracer after it has been released than before it has been released, a similar process can be used. In a particular embodiment, ammonia may be excited by a maser prior to release. If, after release, the ammonia emits energy too quickly to be readily detected by an aircraft or ground-based detector, then energy may be added to the ammonia in a post-release process to increase the chances for detecting this tracer element. Energy may be added to the tracers either from an airborne energy source (block 513), e.g., an energy source carried by the same aircraft as carries the tracer, or from a ground-based energy source (block 514), or both.

As discussed initially with reference to FIG. 2, an alternative approach to directing a physical substance into the vortical flow (process portion 505) includes directing energy into the flow without introducing a separate physical substance (process portion 515). For example, the air adjacent to the wing tip can be ionized by an air ionizer positioned at the wing tip (block 516). The charged ions produced by this process are expected to reflect energy, for example, radar energy, more effectively than nearby non-ionized molecules. Accordingly, a radar detector can be used to identify the ionized molecules. A tungsten electron emitter can be used for ionization, and any of the constituents of air can be ionized depending upon the energy provided. Other ionizers can include vacuum ultraviolet light ionizers, extreme ultraviolet light ionizers, and/or an X-ray emitter. Typical ionization techniques include thermionic emission, field emission, secondary electron emission, the photoelectric effect, cathode rays, charged particle radioactivity, and high-energy electromagnetic radiation. Any of these techniques may be used alone or in combination to generate the desired ions.

Alternatively, the electronic energy state of the molecule may be increased (block 517). Rather than charging the molecules in an ionization process, block 517 includes moving electrons of the molecule from a low or relatively low electronic energy state to a higher electronic energy state. As the electrons descend back to the low energy state, they emit radiation which is then detected by a ground- or air-based detector. In still other embodiments, other techniques for directing energy into the flow may be used (block 518).

Figure 6:
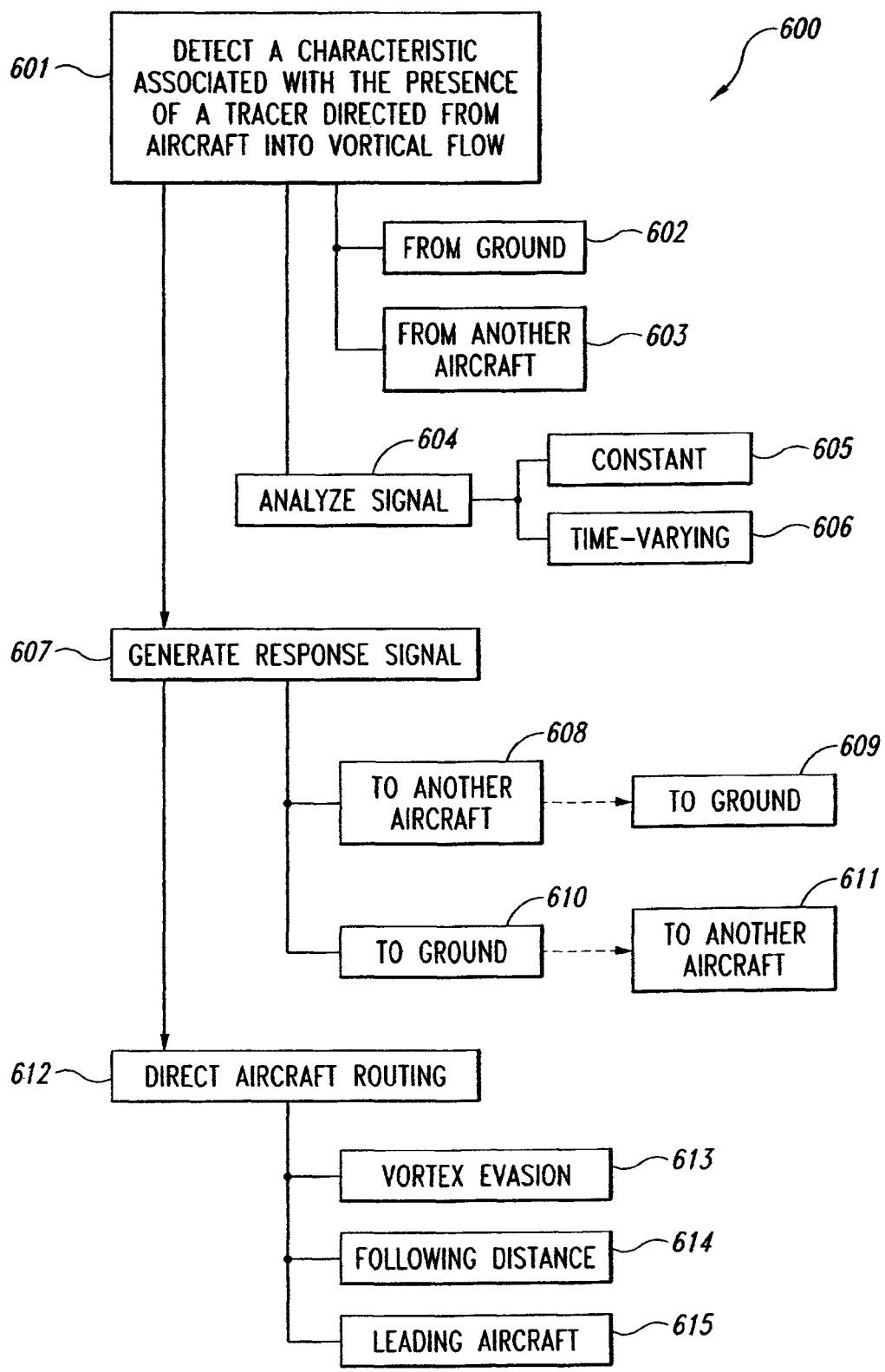
FIG. 6 is a flow diagram illustrating a process for detecting a characteristic associated with the presence of tracers directed from an aircraft into its vortical flow.
Figure 7:
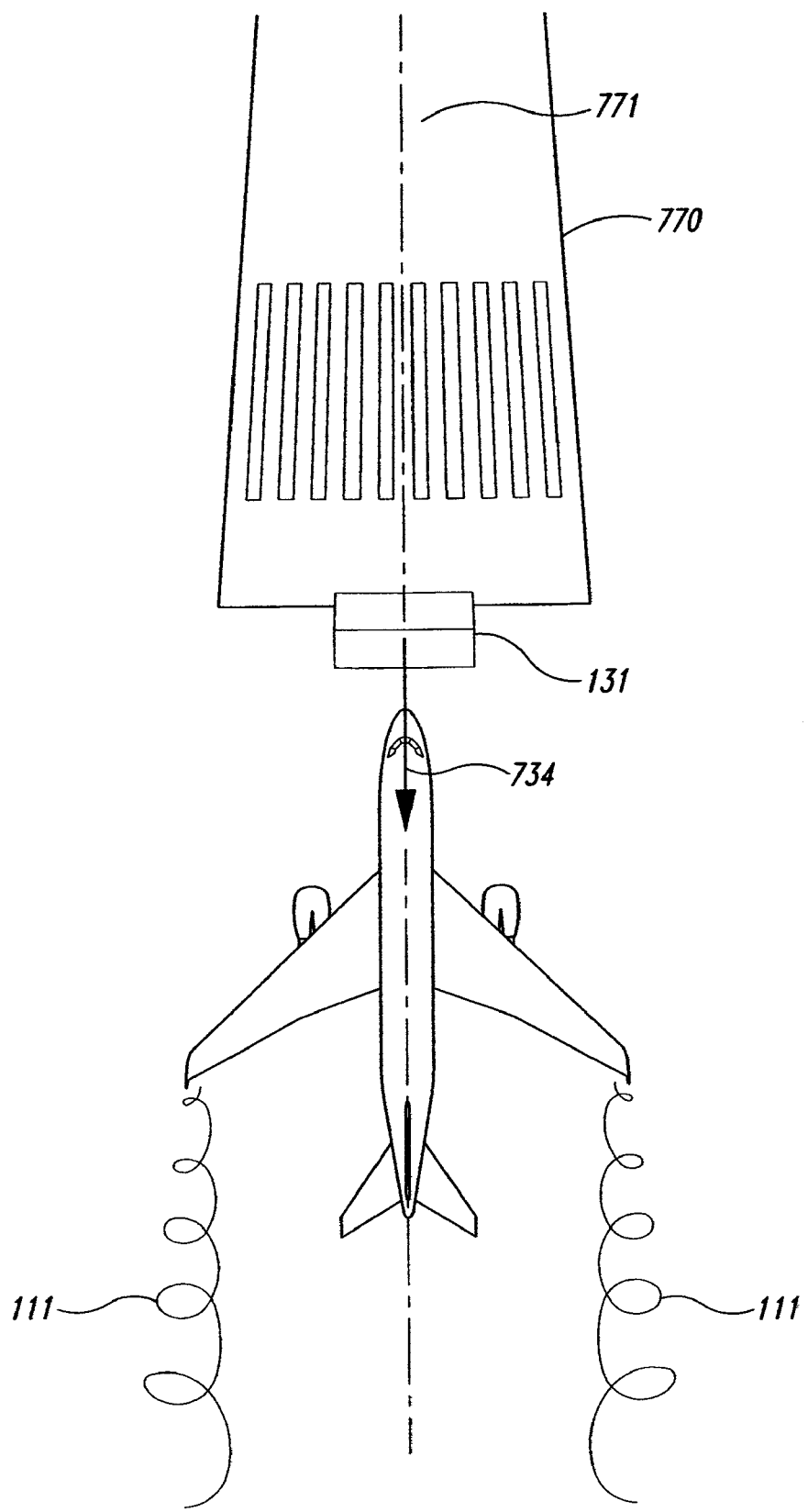
FIG. 7 is a partially schematic top view of an aircraft approaching a ground-based tracer detector positioned and configured in accordance with an embodiment of the invention.

FIG. 6 illustrates a process 600 for detecting the presence of the tracers described above with reference to FIG. 5. Process portion 601 includes detecting a characteristic associated with the presence of a tracer directed from an aircraft into vortical flow. As discussed above, the tracer can include a physical substance directed from the aircraft, energy directed from the aircraft (e.g., energy which is absorbed and re-emitted by the adjacent air), or a combination of a physical substance and energy. Detection techniques include radar (e.g., K-band for ammonia, or X-band for ionized air, or Ka band or W band for other substances) lidar, infrared, acoustic, optical or others. Process 600 can include detecting the characteristic from the ground (block 602) and/or from another aircraft (block 603). Optionally, the detection signal associated with detecting the characteristic can be analyzed (block 604). For example, if the tracers are ejected from the aircraft or otherwise created in a constant process, the signal can be analyzed in accordance with one technique (block 605). If the tracers are ejected or generated in a time varying manner, the signal can be analyzed in accordance with another technique (block 606).

In process portion 607, a response signal is generated, based at least in part upon the detection of the tracer identified in block 601. The response signal can be directed to another aircraft (block 608), or to the ground (block 610). If the response signal is directed to another aircraft, it can also (optionally) be directed to the ground (block 609). If the response signal is directed to the ground, it can also (optionally) be directed to another aircraft (block 611). The response signal can be made evident to a pilot and/or controller by visual, aural and/or other annunciation techniques.

Process portion 612 includes directing aircraft routing, based at least in part upon the response signal. For example, a following aircraft can be directed to evade a vortex (process portion 613). Alternatively (or additionally), the following distance for the following aircraft can be determined, based at least in part on the detection of the vortex (process portion 614). Alternatively (or additionally), the path of the leading aircraft (e.g., the aircraft associated with the detected vortex) can be changed (process portion 615).

FIG. 7 is a partially schematic and compressed illustration of an aircraft 110 approaching a ground-based detector 131 located near an active runway 770. The detector 131 can be aligned with an approach/departure axis 771 of the runway 770. For purposes of illustration, the detector 131 is shown at the end of the runway 770, but it can also be located at other points along the axis 771. The detector 131 can be configured in accordance with any of the foregoing embodiments above, and can accordingly include a radar detector, lidar detector, infrared detector, acoustic detector, optical detector, or other suitable instrument configured to detect a characteristic associated with the tracer emitted by the aircraft 110. Unlike existing detectors, the detector 131 shown in FIG. 7 can have a detection axis 734 that is aligned with the approach/departure axis 771. This is so for at least the reason that the detector 131 need not direct energy transverse to the vortices 111 (as is the case with Doppler-based detectors), but can instead detect the characteristics of the tracer in the vortices 111 from any angle. An expected advantage of this arrangement is that the number of detectors required to generate the information used to route aircraft can be significantly reduced when compared with existing arrangements. A further expected advantage of this arrangement is that the detector 131 can more easily detect vortices generated by aircraft that are off-axis relative to the detector 131, without the need for a large network of detectors.

Furthermore, a ground-based radar (e.g., K-band radar) can be steered in azimuth and elevation to provide two dimensions of reference for the detected vortex. When used to receive energy pulses, range-gating can be used to provide a third or depth dimension. This arrangement can allow for three-dimensional visualization of the wake vortices.

In still further embodiments, the ground-based detector 131 can have other arrangements. For example, the detector 131 can include a network of distributed, spaced-apart detector elements that have known locations relative to each other. Each of these detector elements can detect a characteristic of the tracer. Using phase-shift information and the known distances between detector elements, the system can establish a tomographic map or other representation of the vortex locations. In a particular embodiment, the detector elements can be relatively low-cost devices, located on existing platforms (e.g., cell phone towers) and can be networked using existing network facilities (e.g., a cell phone network).

One feature of at least some embodiments of the foregoing systems and methods is that they include actually detecting characteristics associated with vortices or other vortical flow for aircraft on an individual basis. An expected advantage of this feature is that in many instances, the actual vortex characteristics are likely to be more benign than the "worst-case" characteristics that are conventionally assumed when determining aircraft routes and following distances. Accordingly, it is expected that aircraft following distances may be decreased because the determination of the following distances may be based on case-by-case, actual information, rather than an assumed worst case scenario. In other instances, the following aircraft may be directed to make minor course adjustments to avoid the vortex, without the need for a large following distance. As a result, in at least some cases, it is expected that embodiments of the foregoing systems and methods can increase airport capacity in the range of 50-100%.

Another feature of at least some of the foregoing embodiments is that the equipment for emitting a tracer and, optionally, the equipment for detecting the tracer, can be carried by one or more aircraft. An advantage of this arrangement is that vortices can be detected in regions that are remote from airports, which is where such equipment is conventionally located. As a result, aircraft flying in remote areas can receive vortex information from aircraft up ahead, and can take appropriate action. Again, the information on which the action is based is expected to be more accurate than the assumption of a worst case scenario, and accordingly, it is expected that following distances can be reduced.

Still another feature of at least some of the foregoing embodiments is that the tracer is not visually detectable by an unaided human observer on the ground (e.g., with the naked eye), or to an unaided pilot in a following aircraft. Accordingly, these tracers are unlike visible smoke trails emitted by stunt aircraft, or smoke tracers used for flow visualization during research or experimental flights. An advantage of this feature is that in both crowded air terminal control areas and in locations remote from airports, the tracer is not expected to contribute to visual pollution, which can be an environmental issue and can create confusion to aircraft pilots.

From the foregoing, it will be appreciated that specific embodiments have been described herein for purposes of illustration, but that various modifications may be made without deviating from the invention. For example, non-buoyant materials can be used where it is determined that viscous entertainment will keep the tracer in the vortex for a sufficient period of time. Certain aspects of the invention described in the context of particular embodiments may be combined or eliminated in other embodiments. For example, the overall system shown in FIG. 1 can include more or fewer components and/or component combinations. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. An aircraft system, comprising:
   a payload volume;
   a lifting surface positioned to generate lift and an associated vortical flow; and
   an on-board vortical flow tracer system that includes:
      a tracer director positioned to direct tracer elements into the vortical flow generated by the lifting surface;
      a plurality of jettisonable tracer elements including manufactured, radiation-emitting electronic devices; and
      a controller operatively coupled to the tracer director to selectively activate the tracer director.

2. The system of claim 1 wherein the lifting surface includes a wing having a wing tip, and wherein the tracer director is positioned at least proximate to the wing tip.

3. The system of claim 1, further comprising a tracer reservoir coupled to the tracer director, the tracer reservoir carrying the tracer elements.

4. The system of claim 1 wherein the tracer elements are self-powered.

5. The system of claim 1 wherein the tracer elements include devices that absorb impinging radiation and re-emit radiation.

6. The system of claim 1 wherein the tracer system includes an energy source positioned at least proximate to the tracer director, the energy source being operatively coupled to the controller to add energy to the tracer elements.

7. The system of claim 6 wherein the energy source is positioned to direct energy to the tracer elements after the tracer elements have been directed from the aircraft.

8. The system of claim 6 wherein the energy source is positioned to direct energy to the tracer before the tracer has been directed from the aircraft.

9. A method for identifying aircraft vortical flows, comprising:
   operating a controller to selectively activate a tracer director to direct tracer elements from a first aircraft into a vortical flow generated by the first aircraft, the tracer elements including a plurality of jettisonable tracer elements including manufactured, radiation-emitting electronic devices;
   detecting an emission received from the tracer elements in the vortical flow; and based at least in part on the detected emission, directing the flight of the first aircraft, or a second aircraft following the first aircraft, or both so that the second aircraft avoids the vortical flow.

10. The method of claim 9, further comprising:
    generating a signal in response to detecting the emission;
    transmitting the signal to at least one of an air traffic control and the second aircraft; and
    based at least in part on the generated signal:
       (a) controlling a separation distance between the first aircraft and the second aircraft;
       (b) directing the second aircraft away from the vortical flow; or
       (c) both (a) and (b).

11. The method of claim 9 wherein directing tracer elements includes directing the tracer elements in a time-varying manner.

12. The method of claim 9 wherein directing tracer elements includes directing self-powered tracer elements.

13. The method of claim 9, further comprising directing electromagnetic radiation to the tracer elements to provide power for the electronic devices.

14. The method of claim 9, further comprising increasing an energy of the tracer elements after directing the tracer elements in the vortical flow.

15. The method of claim 14 wherein increasing an energy of the tracer elements includes increasing an energy of the tracer from a location on the ground.

16. The method of claim 14 wherein increasing an energy of the tracer elements includes increasing an energy of the tracer from a location onboard the first aircraft.

17. The method of claim 9 wherein detecting an emission received from the tracer elements includes detecting the emission from the second aircraft.

18. The method of claim 9 wherein detecting an emission received from the tracer elements includes detecting the emission from the ground.

19. The method of claim 9 wherein directing tracer elements includes directing tracer elements during a commercial flight while carrying a revenue-generating payload.

20. The method of claim 9 wherein directing tracer elements includes directing tracer elements that decompose more rapidly after being directed into the flow than before being directed into the flow.

21. The method of claim 20 wherein directing tracer elements includes directing tracer elements that decompose rapidly in the presence of sunlight or water vapor.

22. The method of claim 9 wherein directing tracer elements includes directing tracer elements that include parachutes.

* * * * *